United States Patent [19]

Bollinger et al.

[11] Patent Number: 5,275,356
[45] Date of Patent: Jan. 4, 1994

[54] PROPULSION SYSTEM FOR A V/STOL AIRCRAFT

[75] Inventors: Robert S. Bollinger, Newhall; Leland M. Nicolai, Castaic, both of Calif.

[73] Assignee: Lockheed Corporation, Calabasas, Calif.

[21] Appl. No.: 913,340

[22] Filed: Jul. 15, 1992

[51] Int. Cl.$^5$ .................................................. B64C 29/00
[52] U.S. Cl. .................................. 244/12.3; 244/23 B; 244/55; 244/60; 60/226.1; 60/39.15
[58] Field of Search .................. 244/12, 23, 55, 60; 60/226.1, 39.15

[56] References Cited

U.S. PATENT DOCUMENTS

| | | | |
|---|---|---|---|
| 1,130,623 | 3/1915 | Mustonen . | |
| 2,899,149 | 8/1959 | Brequet | 244/12.3 |
| 2,918,231 | 12/1959 | Lippisch | 244/23 B |
| 3,033,492 | 5/1962 | Rowe | 244/23 |
| 3,068,647 | 12/1962 | Santamanz et al. | 60/226.1 |
| 3,122,343 | 2/1964 | Leibach et al. | 244/60 |
| 3,783,618 | 1/1974 | Kawamoro | 244/23 B |
| 3,972,490 | 8/1976 | Zimmermann et al. | 244/12 |
| 4,469,294 | 9/1984 | Clifton | 244/12.3 |
| 4,474,345 | 10/1984 | Musgrove | 244/53 |
| 4,791,783 | 12/1988 | Neitzel | 60/262 |
| 4,828,203 | 5/1989 | Clifton et al. | 244/12.3 |

FOREIGN PATENT DOCUMENTS 2736120  2/1978  Fed. Rep. of Germany ..... 244/12.3

OTHER PUBLICATIONS

Beviaqua, WO 91/17083, Nov. 14, 1911.

*Primary Examiner*—Galen Barefoot
*Attorney, Agent, or Firm*—Louis L. Dachs

[57] ABSTRACT

The invention is a propulsion system for powering an aircraft in both vertical and horizontal flight modes. In detail, the invention comprises a gas-driven ducted lift fan mounted in the aircraft for providing thrust in the vertical flight mode. A turbofan engine is mounted in the aircraft that comprises a fan section for providing thrust in the horizontal flight mode and a turboshaft engine having an output drive shaft coupled to the fan section for driving same. A gas transfer duct is mounted in the aircraft having a first end adapted to receive exhaust air from the fan section and a second end coupled to the lift fan. A turbocompressor is mounted in the transfer duct and a combustor is mounted in the transfer duct between the turbocompressor and the lift fan, the combustor for receiving and burning fuel and providing combustion gases for driving the ducted left fan. A shafting system couples the turbocompressor to the output shaft of the turboshaft engine. A decoupling system is connected to the shafting system for decoupling the turbocompressor from the output shaft of the turboshaft engine.

4 Claims, 4 Drawing Sheets

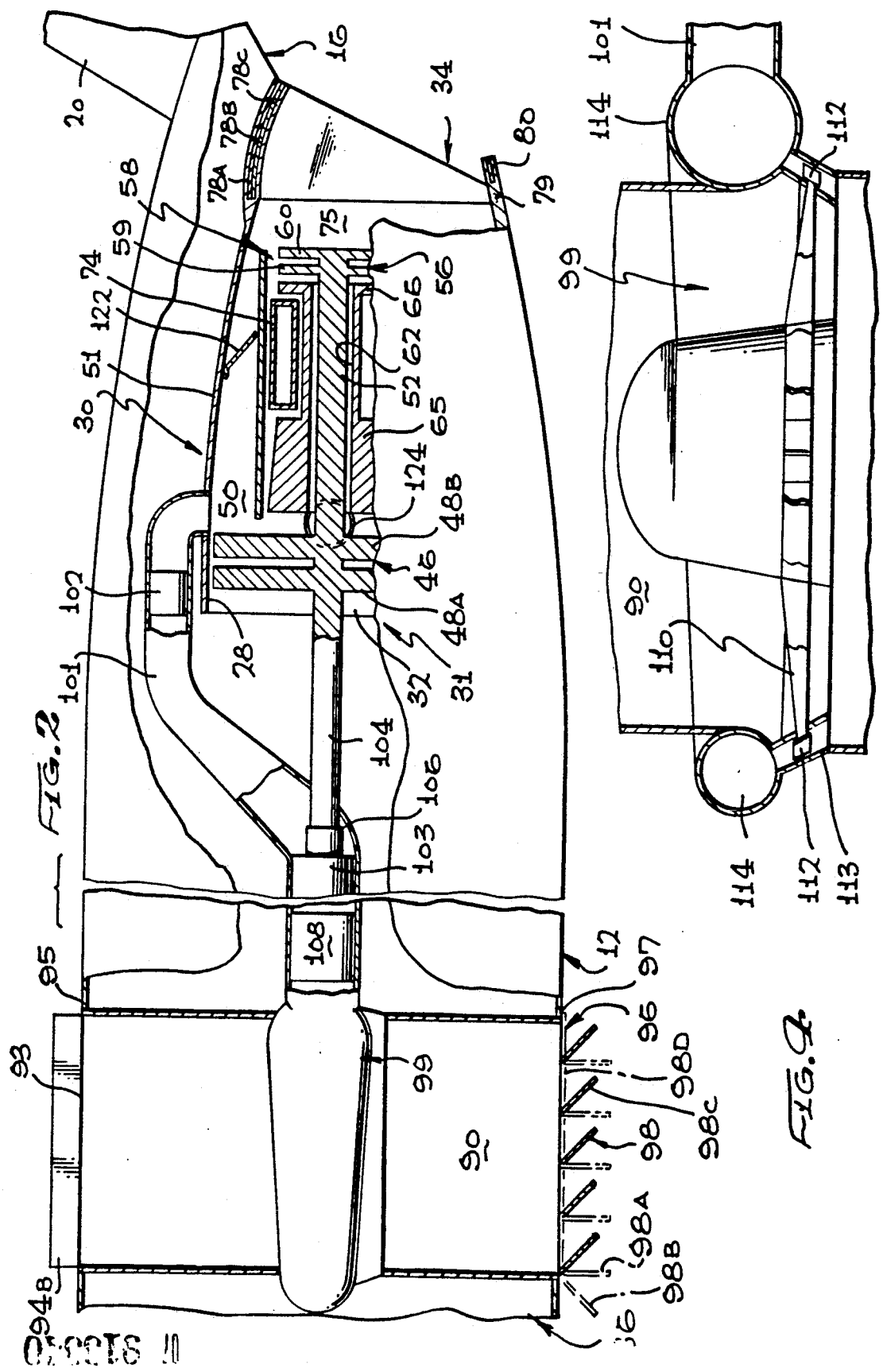

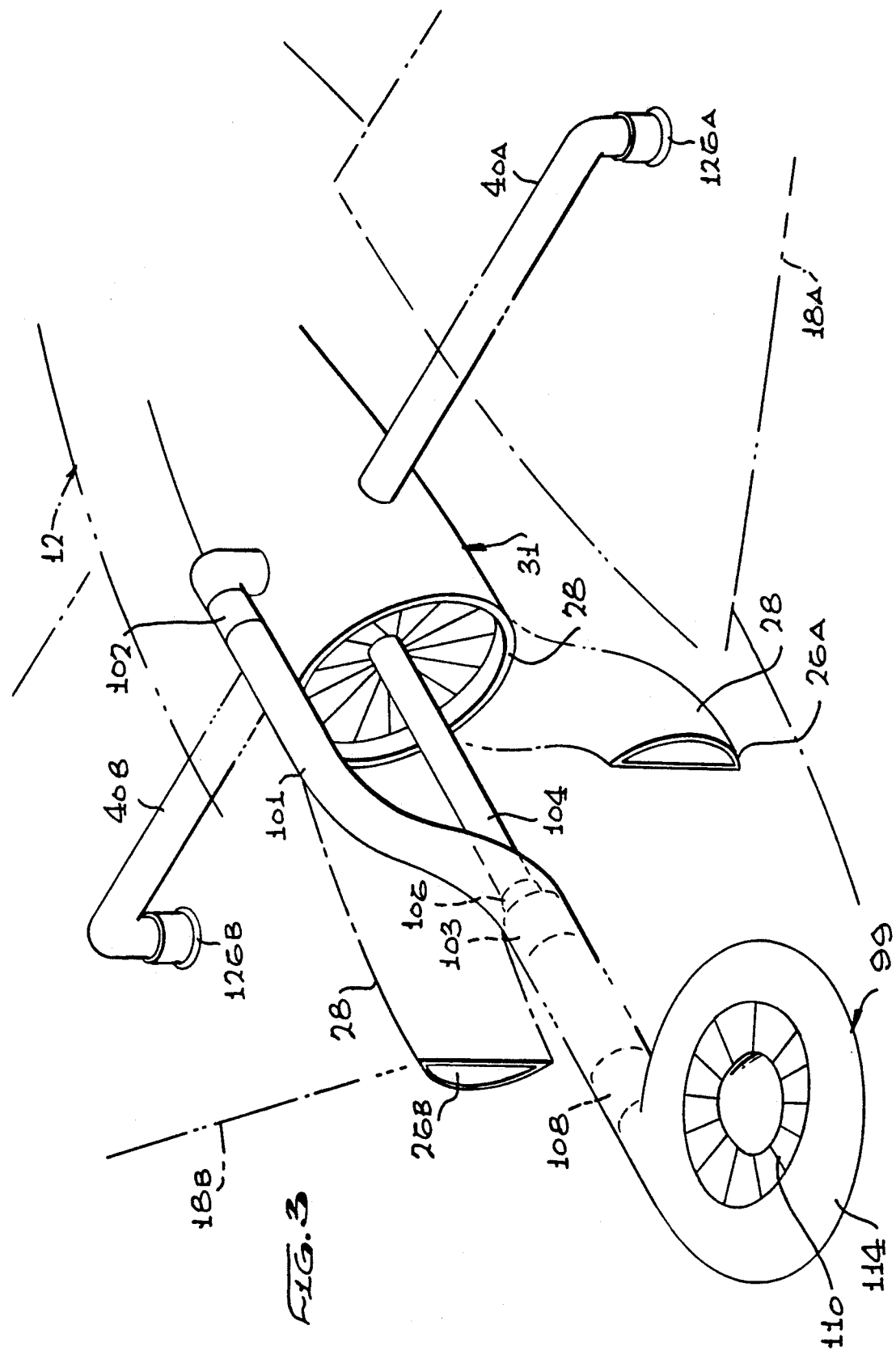

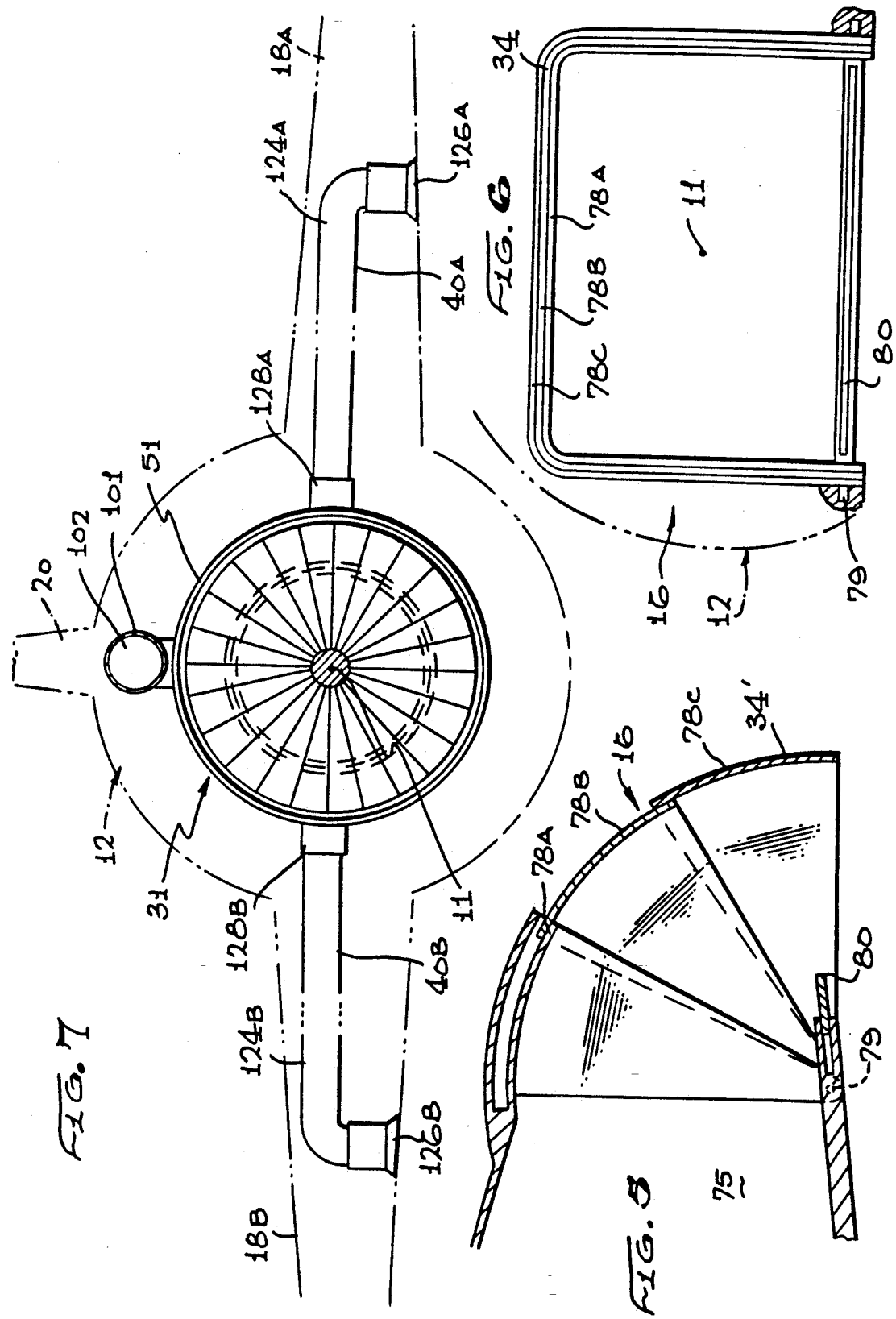

PROPULSION SYSTEM FOR A V/STOL AIRCRAFT

BACKGROUND OF THE INVENTION

1. Field of the Invention

The invention relates to the field of propulsion systems for vertical and/or short takeoff and landing aircraft and, in particular, to propulsion system for providing thrust in the vertical and horizontal flight modes.

2. Description of Related Art

The efficiency of a propulsion system for an aircraft is maximized when the velocity of the exhaust gases equals the velocity of the aircraft in its flight direction at minimum specific fuel consumption. Thus during take off, landing, and hovering, it is obvious that a helicopter, which provides a small incremental velocity to a large mass of air (low-disc loading), is more efficient than a jet aircraft, which provides a large incremental velocity to a small mass of air (high-disc loading). However, a helicopter, because of its very large diameter rotor, has a limited forward velocity, of less than 200 Knots due to compressibility effects on the rotor blade tips. Thus most V/STOL aircraft are compromises, which either limits the forward velocity of the aircraft (helicopter) or requires oversized engines for vertical flight (jet aircraft) causing a loss in cruise efficiency.

For example, the AV-8A Harrier V/STOL aircraft utilizes a turbofan engine for both hover and cruise propulsion. The turbofan engine was sized to produce adequate thrust for vertical lift in hover, but its correspondingly large frontal area increases the drag of the aircraft and limits its maximum speed to less than Mach 1 (approximately 580 Knots at sea level). However, the turbofan exhaust is of significantly high velocity and, thus propulsion efficiency is low at cruise velocities because the engine is oversized for this flight mode while hovering, which requires maximum power, for any significant amount of time is avoided because of the high fuel consumption.

In U.S. Pat. No. 4,474,345, "Tandem Fan Series Flow V/STOL Propulsion System," by R. G. Musgrove, a jet engine with a small fan, which is capable of providing supersonic performance, is modified to provide vertical lift. The basic engine fan is split to provide fore and aft fans connected by means of a common drive shaft. The fans are centrally mounted in a duct located within the aircraft along its longitudinal axis. In normal wingborne flight, (hereinafter referred to as horizontal flight mode), the fans operate in series with the fan exhaust mixing with the turbine exhaust and exiting through a nozzle located at the rear of the aircraft. In the vertical mode of operation, a diverter is positioned downstream of the forward fan and is movable to a position for diverting the exhaust from the forward fan downward relative to the longitudinal axis of the aircraft, while simultaneously opening an auxiliary inlet for permitting the introduction of air to the aft fan. An aft diverter is located in the nozzle which is also moveable to a position for diverting the exhaust from the aft fan and engine core downward. Thus for vertical flight the diverters are actuated causing the exhaust from both fans and the core engine to be directed downward fore and aft of the center of gravity of the aircraft.

However, the tandem fan engine has less thrust in the vertical takeoff and landing mode of operation than it has in the normal flight mode of operation. The thrust is greater in cruise because airflow passes through both fans, and thus the core is supplied with air that is raised to a higher pressure level (supercharged); whereas, in the vertical mode, the core engine airflow passes through only the aft fan. Consequently, the tandem fan concept is not an efficient design for a V/STOL aircraft.

Another more efficient approach is to couple a separate large diameter lift fan to the main turbofan by means of a drive shaft. The lift fan is clutched in and powered only during vertical flight modes. In addition, both the fan section and turbine section exhaust are deflected downward to provide lift. Increased performance is obtained because some of the turbofan's power is being used to drive the lift fan, which is more efficient at the low vertical take-off and landing speeds. Such a system can be found in co-pending U.S. patent application Ser. No. 07/521,211, "Propulsion System For A V/STOL Aircraft," filed May 5, 1990. However, as with all the designs discussed above, the propulsion systems are designed primarily for supersonic high-speed flight and modified for V/STOL operation. They are not readily applicable for subsonic aircraft where significant hover time is required.

In U.S. Pat. No. 4,791,783, "Convertible Aircraft Engine," by R. E. Neitzel, a turbofan concept is disclosed for converting almost all the power used by the engine fan to shaft horsepower to drive a helicopter rotor. Guide vanes located on both sides of the outer portion of the engine fan can be actuated to block off air flow through the fan duct while still allowing air flow into the engine core. A gear mounted on the forward end of the fan shaft is coupled to a drive shaft which in turn drives the rotor. Such a system provides maximum efficiency during take off and landing and also during normal flight. However, if high-speed flight (greater than 0.5 Mach), is to be accomplished, the rotor must be either stopped (x-wing concept) or stopped and stowed. The former concept requires an extremely complex computer-controlled pneumatic blowing system that, to this date, has not been successfully developed. The latter system causes a severe weight penalty and requires a complex folding and stowing system. Furthermore, it is difficult to achieve low-observable (LO) characteristics with either design.

The tilt rotor concept found in the V-22 Osprey aircraft, uses large diameter propellers powered by two cross-shafted turboshaft engines. Its disc loading is higher than a helicopter, but lower than a turbofan and, thus is efficient in the vertical flight modes; however, the large propellers limit the top speed to about 300 Knots at sea level. Again, this is due to compressibility effects on the propeller tips. Furthermore, the large propellers eliminate it as a candidate for missions where a low radar cross-section is required. Tilt pylon-mounted turbofan engines can obtain a higher cruising speed, but lose vertical flight mode efficiency because of the high-disc loadings. In addition, pylon-mounted engines of any type, where the fan is visible to radar signals, are also unsuitable for LO missions.

The type of V/STOL aircraft that appears to be most suitable for missions where low radar cross-section is required is one where the entire propulsion system is imbedded in the aircraft wing and/or fuselage. For example, as in a ducted fan-in-wing for the vertical flight mode and turbojet or turbofan engines for the horizontal flight modes. The overall concept is rather old, dating at least back to 1914. For example, U.S. Pat.

No. 1,130,623, "Flying Machine," by M. L. Mustionen, discloses pylon-mounted lift propellers and a pusher propeller mounted in the tail, all powered by a single-piston engine. However, with modern V/STOL aircraft, safety requirements dictate the use of multiple engines with cross-shafting to obtain engine-out performance in the vertical flight mode. Examples of this concept can be found in U.S. Pat. No.'s 4,828,203, "Vertical/Short Take-Off And Landing Aircraft," and 4,469,294, "V/STOL Aircraft," both by R. T. Clifton, et al. This aircraft design uses two pylon-mounted ducted propellers for the vertical flight mode and a rear-mounted ducted propeller for the horizontal flight mode. Two engines are mounted in the airframe and "belt drive" a common shaft that is directly connected to the rear-mounted propeller. The drive shaft is also connected to a right-angle gearbox which in turn drives the two pylon-mounted ducted lift propellers by means of belt drives. It is apparent that such a combination aircraft design and propulsion system, as configured, does not lend itself to LO missions because of the rear-mounted ducted propeller used for the horizontal flight mode. However, even if it were installed in a proper airframe, it still would not provide the necessary propulsion efficiency and engine-out performance required for any practical aircraft.

The basic problem is that in an aircraft, such as a transport, the ratio of thrust required for takeoff in the vertical flight mode to that required for efficient cruise in the horizontal flight mode is on the order of 10 to 1. Having multiple engines simply to provide for engine-out capability yields a thrust mismatch between the cruise and vertical flight modes. If the aircraft has only two engines and it requires both engines for a normal takeoff in the vertical flight mode, then each engine alone must be able to provide the total thrust required (in a max power setting for engine-out capability. This means that each of the two engines must be greatly oversized and, therefore, will yield very poor cruise efficiency. It's either this approach or stay with a single engine, as in the AV-8A Harrier aircraft.

In applicants co-pending patent application Ser. No. 913,576 filed Jul. 5, 1992, this problem is addressed. In detail, the invention includes a pair of ducted lift fans mounted in the aircraft for providing thrust in the vertical flight mode. A pair of ducted cruise fans are mounted in the aircraft for providing thrust in the horizontal flight mode. Two sets of turboshaft engines are mounted in the aircraft with each of the sets comprising a plurality of the turboshaft engines, each turboshaft engine including an output shaft and having an optimal power output sufficient for powering one of the pairs of ducted cruise fans in the horizontal flight mode. Each of the sets includes a sufficient number of the turboshaft engines to provide an optimal power output for powering one of the pairs of ducted lift fans and one of the pairs of ducted cruise fans in the vertical flight mode. A shafting system is mounted in the aircraft for coupling all of the turboshaft engines to the pairs of ducted fans. A first decoupling system is connected to the shafting system for decoupling the pair of ducted lift fans from the sets of turboshaft engines. Finally, a second decoupling system is connected to the shafting system for individually decoupling each of the turboshaft engines from the shafting system.

To eliminate these large transmissions, hot gas-driven ducted lift fans have been substituted for the shaft-driven fans. An example of this approach can be found in U.S. Pat. No. 3,972,490, "Trifan Powered V/STOL," by V. H. Zimmermann. In this invention the exhaust from two turbines are connected by transfer ducts to a nose-mounted, tip-driven, ducted lift fan and two pylon-mounted ducted cruise fans. The cruise fans, which are tip driven, incorporate fan exhaust deflectors that are extended to divert the fan exhaust downward during the vertical flight mode. During the horizontal flight mode, the ducts to the ducted lift fan are closed off by means of valves. In U.S. Pat. No. 3,033,492, "Cruise Lift Fan System," by B. H. Rowe, a propulsion system is disclosed wherein two tip-driven ducted fans are rotatably mounted on pylons such that they can be rotated from the horizontal, for cruise, to the vertical for takeoff and landing. The two ducted fans are driven by exhaust gases from two turbojet engines or the like. This concept also suffers from the same limitations as previously set forth above.

While this invention eliminates the weight of the gearboxes, etc., the transfer ducts must be designed to handle hot gases and, thus must be made of steel, which adds weight or titanium which adds considerable cost. In addition, the transfer ducts run through a considerable portion of the aircraft and must be insulated from other systems such as avionics and hydraulic systems. This can also add weight. In addition, should the transfers ducts, which can run in close proximity to the fuel tanks or the cockpit, develop a leak or are punctured, the result could cause a catastrophic failure of the aircraft.

Thus it is a primary object of the subject invention to provide a propulsion system for a vertical and/or short take-off and landing aircraft.

It is a further object of the subject invention to provide a propulsion system for use in low-observable vertical and/or short take-off and landing aircraft.

It is another object of the subject invention to provide a propulsion system for a vertical and/or short takeoff and landing aircraft wherein the lift fan is driven by hot gas.

It is another object of the subject invention to provide a propulsion system for a vertical and/or short take-off aircraft and landing wherein relatively cool-ducted cruise fan exhaust air is transferred to the ducted lift fan via transfer ducts and heated by the addition of fuel at the entrance to the hot gas-driven ducted lift fan.

SUMMARY OF THE INVENTION

The invention is a propulsion system for powering an aircraft in both vertical and horizontal flight modes. In detail, the invention includes a gas-driven ducted lift fan mounted in the aircraft for providing thrust in the vertical flight mode. A turbofan engine is mounted in the aircraft that comprises a fan section for providing thrust in the horizontal flight mode and a turboshaft engine having an output drive shaft coupled to the fan section for driving same. A gas transfer duct is connected by a first end to the turbofan engine aft of the fan section and is adapted to receive exhaust air therefrom and a second end coupled to the ducted lift fan. A turbocompressor is mounted in the transfer duct. A combustor is mounted in the transfer duct between the turbocompressor and the entrance to the ducted lift fan and is adapted to receive and burn fuel and provide the combustion products therefrom (hot gas) to the ducted lift fan. A shaft is coupled between the turbocompressor and the fan section of the turboshaft engine and a decoupling system (typically a clutch) is connected between the shaft and turbocompressor for decoupling the turbocompressor from the fan section of the shaft.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a partial cross-sectional view of the aircraft shown in FIG. 1 taken along the line 2—2, particularly illustrating the subject propulsion system.

FIG. 3 is a partial perspective view of the subject propulsion system.

FIG. 4 is a cross-sectional view of FIG. 2 taken along the line 4—4, particularly illustrating the gas-driven ducted lift fan.

FIG. 5 is an enlarged view of the nozzle section of the propulsion system shown in FIG. 2.

FIG. 6 is a view looking forward from the rear of the nozzle section shown in FIG. 5.

FIG. 7 is a cross-sectional view of the aircraft shown in FIG. 1 taken along the line 7—7, particularly illustrating the roll/yaw control system.

DESCRIPTION OF PREFERRED EMBODIMENT

Figure 1:
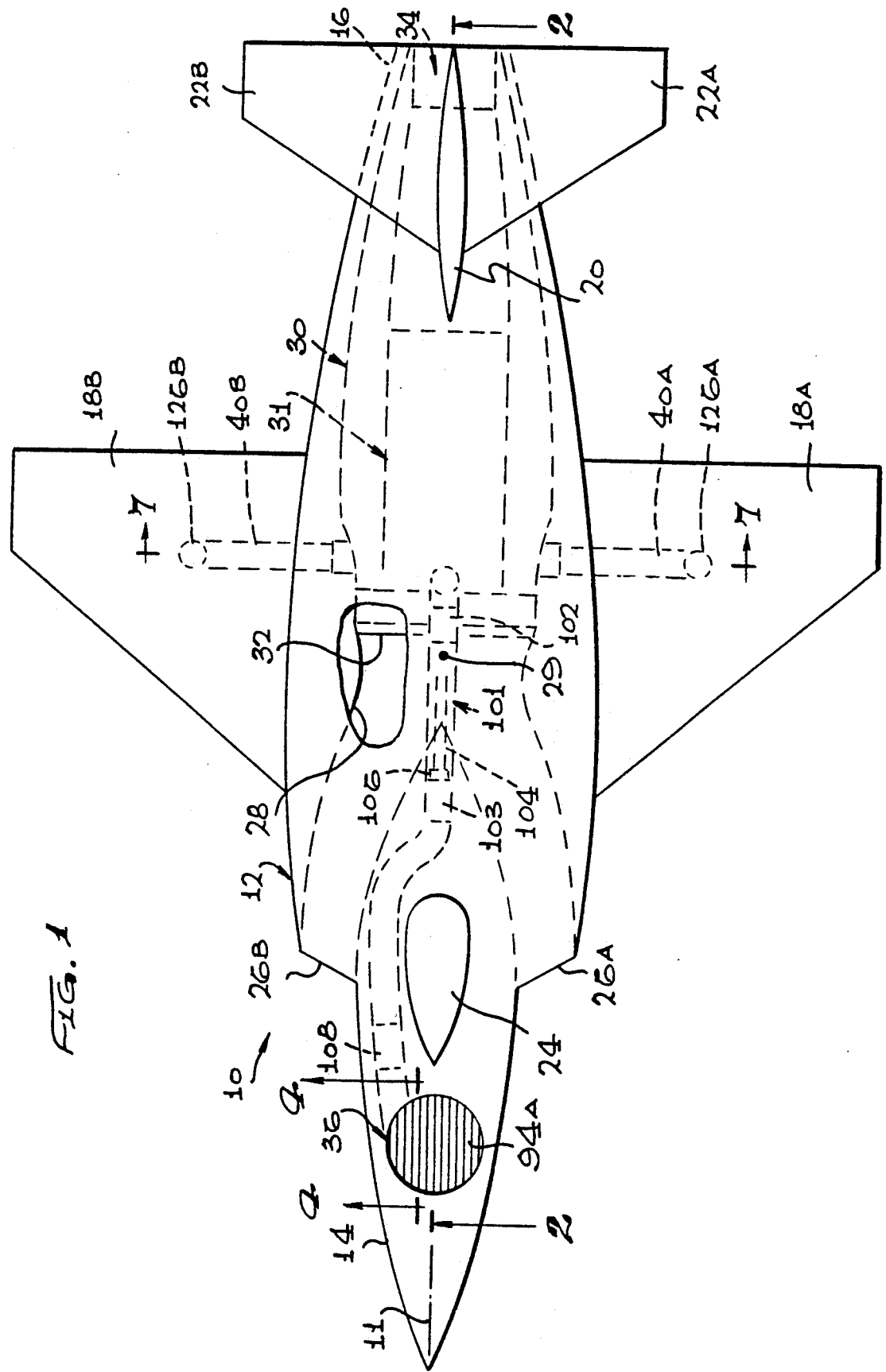
FIG. 1 is a planform view of a V/STOL aircraft incorporating the subject propulsion system.

Illustrated in FIG. 1 is a conventional V/STOL type aircraft, generally indicated by numeral 10, having a longitudinal axis 11. The aircraft 10 includes a fuselage 12 with a nose section 14, tail section 16, wings 18A and 18B, vertical stabilizer 20, and horizontal stabilizers 22A and 22B. Other features include a cockpit 24, engine inlets 26A and 26B which join to form an engine inlet duct 28. The center of gravity of the aircraft is indicated by numeral 29. The subject propulsion system, generally indicated by numeral 30, includes a turbofan engine 31 having an inlet 32 in communication with duct 28 and an exhaust nozzle section 34 at the tail 16. A vertically mounted gas-driven ducted lift fan assembly 36 is mounted in the aircraft in front of the turbofan engine 31 and is driven thereby in a manner to be subsequently described. Additionally illustrated are roll/yaw control assemblies 40A and 40B which are coupled to the engine 31 and exit to either side of fuselage 12 on the underside of the wings 18A and 18B, respectively. A further explanation of the function of the roll/yaw control nozzle assemblies 40A and 40B will be subsequently provided.

Illustrated in FIG. 2 is a partial cross-sectional view of the aircraft shown in FIG. 1 while a perspective view of the propulsion system is provided in FIG. 3. As previously stated, the propulsion system 30 includes the turbofan engine 31, and as depicted, it is a two-spool mixed-flow type wherein the fan and turbine exhausts are mixed together in a common duct 75 and exit through a common nozzle 34. In detail, the engine 31 includes a fan section 46 comprising fans 48A and 48B located within a fan bypass air duct 50 defined by a cylindrical wall 51. The fans 48A and 48B are attached to a rotatably mounted drive shaft 52 and also to drive shaft 104. The opposite end of the drive shaft 52 is attached to a low-pressure turbine portion 56 of a turbine section 58. The low-pressure turbine portion 56, for purposes of illustration, incorporates two turbines 59 and 60. However, as will be subsequently discussed, in some instances only one or more than two may be necessary.

Rotatably mounted about the drive shaft 52 is a hollow drive shaft 62 attached at one end to a high-pressure compressor section 65 and at its opposite end to a high-pressure turbine portion of turbine section 58 and as illustrated comprising a single turbine 66. A combustion section 74 is positioned between the high-pressure compressor 65 and high-pressure turbine 66. The fan section 46 and turbine section 58 exhausts join together within a common duct portion 75 and exits out the exhaust nozzle section 34 during the normal flight operation. The high-pressure compressor section 65, combustion section 74 and turbine section 58 is typically called the core.

The exhaust nozzle section 34 is designed to divert the exhaust from a horizontal direction aligned with the longitudinal axis 11 (best seen in FIG. 1) for normal flight to a vertically downward direction (90 degrees) for takeoff and landing, but can be vectored at any angle between 0 degrees and 90 degrees. Still referring to FIG. 2 and additionally to FIGS. 5 and 6, which are side and aft views, respectively of the aircraft shown in FIG. 1, it can be seen that the nozzle section 34 includes a plurality of rectangular telescoping sections 78A, 78B and 78C rotatably mounted at their ends about a pivot point 79. Thus when the nozzle is retracted, it has a generally rectangular shaped cross-section and when extended, indicated by numeral 34', diverts the exhaust 90 degrees to a downward direction. Such nozzles are old in the art and thus need not be discussed in further detail.

An extendable and retractable slidable plate 80 is located at the bottom of the nozzle section 34. When the telescoping sections 78A-C are extended during takeoff and landing, the nozzle section cross-sectional area can be varied by moving the plate 80 either inward or outward and in so doing varies the back pressure within the common duct portion 75 of the duct 50. Since the flow is subsonic within the common duct 75, the power extracted from the engine core exhaust by the low-pressure turbine portion 56 is a function of the pressure differential and the associated temperature change across the low-pressure turbine portion 56. Furthermore, the pressure and temperature of the combustion products leaving the combustion section 74 and passing through the high-pressure turbine 66 and entering the low-pressure turbine portion 56 is constant for a specific engine power setting; thus power extraction increases as the pressure in duct 75 is reduced. The decrease in back pressure has little or no effect on the high-pressure turbine 66, thus there is no effect on the compressor section 65. The additional power extracted from the turbine exhaust by the low-pressure turbine portion 56 is applied to the lift fan assembly 36 as now described.

Primarily referring to FIGS. 1-3 and, additionally to FIG. 4, it can be seen that the lift fan assembly 36 comprises a vertical duct 90 which extends through the aircraft having an entrance 93 covered by a plurality of moveable doors 94 at the top 95 of the aircraft, and an exit 96 at the bottom 97 covered by a plurality of louvers 98. A lift fan 99 is mounted therein. The doors 94 are moveable from fully retracted position, indicated by numeral 94A (best seen in FIG. 1), during normal flight to fully opened position, indicated by numerals 94B (best seen in FIG. 4), for takeoff and landing in the vertical flight mode and transition to and from the horizontal flight mode.

Referring particularly to FIGS. 1, 2 and 4, an air transfer duct 101 couples the bypass air duct 50 to the ducted lift fan 99. A flow control valve 102 is mounted in the air transfer duct 101. A shaft-driven turbocompressor 103 is mounted in the transfer duct 101 and is coupled to the fan section 46 by means of a driveshaft 104 and driven thereby. A decoupling assembly 106 (typically a clutch) is mounted between the turbocompressor 103 and driveshaft 104 for decoupling the turbocompressor from the fan section after transition from the vertical flight mode to the horizontal flight mode. A combustor 108 is also mounted within the transfer duct 101 at the entrance to the lift fan 99 that is adapted to receive and burn fuel there within, which increases the energy of the gas being directed to the ducted lift fan assembly 36.

Referring particularly to FIGS. 2 and 4, the lift fan blades 110 of the ducted lift fan 99 have turbine-like tip members 112. The transfer duct 101 terminates in a circular-shaped distribution chamber or plenum 114 that extends about the lift fan 99, and directs the exhaust gases from the combustor 108 to these tip members 112 via a ring-shaped nozzle 113 causing the lift fan blades 110 to rotate. The louvers 98 of the ducted lift fan assembly 36 are shown in the fully extended position in solid lines and indicated by numeral 98A and in the partially, fore, aft and fully closed positions in dotted lines and indicated by numerals 98B, 98C and 98D respectively. As they translate forward 98B, they are able to direct ducted lift fan exhaust forward to provide horizontal control and braking when transitioning from the horizontal to the vertical flight modes and backward 98C providing horizontal control and forward thrust during transition from the vertical to the horizontal flight modes. Additionally, they can be operated in a stagger arrangement (one louver directed forward and the adjacent louver directed aft) to modulate the lift fan force for both vertical control (ascent and descent) and pitch control. They are fully closed 98D in the horizontal flight mode. Additionally, brake assemblies (not shown) are incorporated into the ducted lift fans for stopping the lift fan blades after transition to the horizontal flight mode. It should be noted that such gas-driven ducted lift fans are old in the art and, thus need not be discussed in further detail.

In the vertical mode of operation, the engine 31 can operate in a separate flow cycle mode allowing the engine fan section 46 bypass air to be routed to nozzles located in the aircraft's wings 18A and 18B to produce reaction roll/yaw control power. Still referring to FIG. 2 and additionally to FIGS. 3 and 7, all showing the left and right roll/yaw control assemblies 40A and 40B, respectively, it can be seen that the fan section 46 exhaust can be blocked off by a plurality of doors 122. These doors 122, which are mounted on the duct wall 51 are moveable inwardly so as to block off the fan section 46 bypass air flow in the duct 50. Left and right roll/yaw control ducts 124A and 124B, respectively, are connected to the duct wall 51 just downstream of the fan 48B and extend outward from the longitudinal axis 11 and terminate in left and right downward directed gimbled, variable cross-sectional area roll/yaw control nozzles 126A and 126B, respectively. Control valves 128A and 128B control the flow into the ducts 124A and 124B, respectively, while nozzles 126A and 126B control the rate/yaw of flow for roll control. By differential vectoring (gimbling) of the nozzles 126A and 126B in the longitudinal direction, yaw control can also be accomplished in the vertical flight mode. Pitch control is accomplished by means of the variable stagger of the louvers 98 that can be modulated to control the thrust produced by the lift fan 99 working in concert with the sliding plate 80 in the exhaust nozzle.

Thus the vertical or short take-off procedure would begin with the starting of the engine 30. The nozzle section 34 is adjusted such that the turbine exhaust is directed downward, the clutch 106 is engaged, the doors 94 are positioned in the fully opened position 94B. The louvers 98 are positioned in a partial stagger to provide lift plus a margin for vertical control and pitch control. The doors 122 are extended so that the fan section 46 bypass air is diverted to the roll/yaw control nozzle assemblies 40A and 40B and to the air transfer duct 101, the control valves 102, 128A and 128B are open. The slidable plate 80 is adjusted so that the engine operating point is shifted such that more power is extracted by the low pressure turbine portion 56 (turbines 59 and 60) which is transferred to the fan section 46 and turbocompressor 103; however, the additional power is only absorbed by the turbocompressor and, ultimately, the lift fan 99. As engine power is increased, the aircraft will gain altitude on the thrust from the lift fan assembly 36 and the roll/yaw control nozzles 126A and 126B and also from the turbine exhaust exiting out of the nozzle section 34.

An added benefit of diverting the fan section 46 bypass air is that the back pressure in the common duct portion 75 is further reduced; thus this feature can be used in conjunction with the slidable plate 80 to control the power extracted by the low-pressure turbine portion 56 of the turbine section 58. In fact, in some instances, it may be possible to modulate the doors 122 and valves 102, 128A and 128B to control the back pressure in the common duct portion 75 so that the need for the slidable plate 80 is eliminated.

After sufficient altitude is reached, the telescoping sections 78A, 78B and 78C are slowly retracted allowing the turbine exhaust to move toward alignment with the longitudinal axis 11 of the aircraft producing a forward thrust. The louvers 98 are also rotated aft toward the partially closed position 98C to vector the exhaust thrust rearward to provide acceleration. These louvers 98 and telescoping sections 78A-C are modulated to control the resultant thrust at the desired angle as a function of aircraft forward speed during transition to the horizontal flight. After sufficient aerodynamic lift is produced to maintain the altitude of the aircraft and, on a computer controlled schedule, the fuel to the combustor 108 is terminated, the turbocompressor 103 is declutched and the lift fan 99 is stopped, lift fan doors 94 and louvers 98 are closed (to positions indicated by numerals 94A and 98D), the doors 122 are retracted, valves 128A and 128B are closed, the telescoping sections 78A, 78B and 78C are fully retracted and the slidable plate 80 is repositioned so that the engine operating point is returned to its cruise mode of operation. For vertical or short landing, the procedure is reversed. The main difference is that, after the lift fan is activated, the louvers 98 are angled forward (to the position indicated by numeral 98B) to decelerate the aircraft.

While the invention has been described with reference to a particular embodiment, it should be understood that the embodiment is merely illustrative as there are numerous variations and modifications which may be made by those skilled in the art. Thus the invention is to be construed as being limited only by the spirit and scope of the appended claims.

INDUSTRIAL APPLICABILITY

The invention has application in the aircraft industry.

We claim:

1. A propulsion system for powering an aircraft in both vertical and horizontal flight modes comprising:
   a gas-driven ducted lift fan mounted in the aircraft for providing thrust in the vertical flight mode;
   a turbofan engine mounted in the aircraft comprising:
     a fan section for providing thrust in the horizontal flight mode; and
     a turboshaft engine having an output drive shaft coupled to said fan section;
   a gas transfer duct having a first end adapted to receive exhaust air from said fan section and a second end coupled to said lift fan;
   a turbocompressor mounted in said transfer duct;
   a combustor mounted in said transfer duct between said turbocompressor and said lift fan, said combustor for receiving and burning fuel and providing combustion gases for driving said ducted lift fan;
   a shafting means for coupling said turbocompressor to said output shaft of said turboshaft engine; and
   a decoupling system connected to said shafting means for decoupling said turbocompressor from said output shaft of said turboshaft engine.

2. The propulsion system as set forth in claim 1 further comprising:
   said shafting means comprising a shaft having a first end coupled to said fan section and a second end coupled to said turbocompressor; and
   said decoupling system comprising a clutch coupled to said shaft between said fan section and said turbocompressor.

3. The propulsion system as set forth in claim 2 further comprising said lift fan having thrust modulating and directing louvers mounted in the exhaust duct thereof.

4. The propulsion system as set forth in claim 3 wherein means are provided for roll, yaw, pitch and horizontal control of the aircraft.

* * * * *